US010033315B2

(12) United States Patent
Spielmann et al.

(10) Patent No.: US 10,033,315 B2
(45) Date of Patent: Jul. 24, 2018

(54) PHASE CONTROL LOOP, GENERATOR CONTROL DEVICE AND METHOD FOR ACTIVATING AN ELECTRIC DRIVE SYSTEM OF A HYBRID VEHICLE

(71) Applicant: Robert Bosch GmbH, Stuttgart (DE)

(72) Inventors: Bernd Spielmann, Ingersheim (DE); Martin Silberbauer, Wien (AT); Meinrad Praxmarer, Wien (AT); Milos Medvecky, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 61 days.

(21) Appl. No.: 14/916,323

(22) PCT Filed: Jul. 9, 2014

(86) PCT No.: PCT/EP2014/064702
§ 371 (c)(1),
(2) Date: Mar. 3, 2016

(87) PCT Pub. No.: WO2015/032531
PCT Pub. Date: Mar. 12, 2015

(65) Prior Publication Data
US 2016/0204724 A1 Jul. 14, 2016

(30) Foreign Application Priority Data

Sep. 9, 2013 (DE) .................. 10 2013 217 968

(51) Int. Cl.
*H02P 9/04* (2006.01)
*H02P 21/05* (2006.01)
(Continued)

(52) U.S. Cl.
CPC .................. *H02P 9/04* (2013.01); *B60K 6/46* (2013.01); *B60W 10/06* (2013.01); *B60W 20/00* (2013.01); *H02P 21/05* (2013.01)

(58) Field of Classification Search
CPC ............ H02P 21/05; H02P 9/04; B60W 30/20
(Continued)

(56) References Cited

U.S. PATENT DOCUMENTS 5,559,421 A * 9/1996 Miyakawa .............. H02M 1/12
307/105
2009/0140678 A1* 6/2009 Nakao ..................... B60K 6/485
318/400.23
(Continued)

FOREIGN PATENT DOCUMENTS

DE     3923532     1/1991
DE     19713181     10/1998
(Continued)

OTHER PUBLICATIONS

International Search Report for Application No. PCT/EP2014/064702 dated Nov. 6, 2014 (English Translation, 3 pages).

*Primary Examiner* — Sean Gugger
(74) *Attorney, Agent, or Firm* — Michael Best & Friedrich LLP

(57) ABSTRACT

The invention relates to a phase control loop for the rotational speed regulation of an electric generator fed by an internal combustion engine, having an input connection, which is designed to receive a rotational speed signal measured on a drive shaft of the electric generator, an amplitude determination device, which is coupled to the input connection and which is designed to determine the amplitude of rotational speed ripples of the measured rotational speed signal, a correction function device, which is coupled to the amplitude determination device and the input connection and which is designed to determine a rotational speed correction signal on the basis of the determined amplitude of the rotational speed ripple and of the measure rotational speed signal, a phase discriminator, which is coupled to the amplitude determination device and the
(Continued)

correction function device and which is designed to determine a phase difference signal between the measured rotational speed signal and the rotational speed correction signal, wherein the correction function device is designed to regulate the rotational speed correction signal on the basis of the determined phase difference signal to a phase difference of zero, and a summing element, which is designed to subtract the rotational speed correction signal from the measured rotational speed signal and to provide a corrected rotational speed signal to an output connection of the phase control loop.

9 Claims, 2 Drawing Sheets

(51) Int. Cl.
  *B60K 6/46* (2007.10)
  *B60W 10/06* (2006.01)
  *B60W 20/00* (2016.01)
(58) Field of Classification Search
  USPC .......................................................... 322/58
  See application file for complete search history.

(56) References Cited

U.S. PATENT DOCUMENTS

| | | | |
|---|---|---|---|
| 2010/0089064 A1* | 4/2010 | Falkenstein | B60K 6/48 60/702 |
| 2012/0179316 A1* | 7/2012 | Morris | G01P 3/489 701/22 |
| 2012/0259570 A1* | 10/2012 | Zhang | B60W 10/08 702/65 |

FOREIGN PATENT DOCUMENTS

| | | |
|---|---|---|
| DE | 10051916 A1 | 5/2001 |
| DE | 19959939 | 6/2001 |
| DE | 102004062012 | 7/2006 |
| DE | 102012000144 | 7/2012 |
| DE | 102012102172 | 10/2012 |
| EP | 0133426 | 2/1985 |
| EP | 1107008 | 6/2001 |
| WO | 0114944 | 3/2001 |
| WO | 2006069833 | 7/2006 |

* cited by examiner

PHASE CONTROL LOOP, GENERATOR CONTROL DEVICE AND METHOD FOR ACTIVATING AN ELECTRIC DRIVE SYSTEM OF A HYBRID VEHICLE

BACKGROUND OF THE INVENTION

The invention relates to a phase control loop, a generator control device and a method for activating an electric drive system of a hybrid vehicle.

An internal combustion engine drives an electrical machine as a generator in hybrid vehicles having range extenders. The internal combustion engine is thus permanently mechanically coupled to the generator. Because the internal combustion engine does not have to be driven with low rotational speeds, the flyweight of the internal combustion engine can be chosen small or completely saved, wherein only the mass of the internal combustion engine and the electrical machine is used as the flyweight. This reduction of the flyweight, however, simultaneously causes an increase in the torque ripple of the drive shaft by means of the torque of the engine pulsating at the ignition frequency of the internal combustion engine.

The German patent publication DE 10 2004 062 012 A1 proposes, for example, in a system consisting of internal combustion engine and electrical machine and coupled via a rigid drive shaft, detecting actual rotational speeds of the individual machines in order to dampen vibrations and activating target torques of the two machines.

There is, however, the need for options to prevent the transmission of torque ripples of an internal combustion engine to an electric generator and thus reduce the vibrations of the internal combustion engine housing and suppress current oscillations in the output current of the electric generator.

SUMMARY OF THE INVENTION

According to one aspect of the invention, the present invention therefore relates to a phase control loop for the rotational speed regulation of an electric generator fed by an internal combustion engine, having an input connection, which is designed to receive a rotational speed signal measured on a drive shaft of the electric generator, an amplitude determination device, which is coupled to the input connection and which is designed to determine the amplitude of rotational speed ripples of the measured rotational speed signal, a correction function device, which is coupled to the amplitude determination device and the input connection and which is designed to determine a rotational speed correction signal on the basis of the determined amplitude of the rotational speed ripples and of the measured rotational speed signal, a phase discriminator, which is coupled to the amplitude determination device and the correction function device and which is designed to determine a phase difference signal between the measured rotational speed signal and the rotational speed correction signal, wherein the correction function device is designed to regulate the rotational speed correction signal on the basis of the determined phase difference signal to a phase difference of zero, and a summing element, which is designed to subtract the rotational speed correction signal from the measured rotational speed signal and to provide a corrected rotational speed signal to an output connection of the phase control loop.

According to a further aspect of the invention, the present invention relates to a generator control device for regulating the rotational speed of an electric generator fed by an internal combustion engine, comprising a phase control loop according to the invention, a correction element which is designed to subtract a rotational speed correction signal generated by the phase control loop from an actual value rotational speed signal and to generate a resulting corrected actual value rotational speed signal, a rotational speed control device which is coupled to the correction element and which is designed to determine a target value torque from the corrected actual value rotational speed signal, a current regulating device which is coupled to the rotational speed regulating device and which is designed to determine a target value current from the determined target value torque and an n-phase power inverter device which is coupled to the current regulating device and which is designed to generate an n-phase AC signal for activating the electric generator.

According to a further aspect of the invention, the present invention relates to an electric drive system, comprising an internal combustion engine, an electric generator which is connected to the internal combustion engine, an inventive generator control device which is designed to activate the electric generator and an internal combustion engine control device which is designed to output a target value rotational speed signal to the generator control device and to output a target torque for activating the internal combustion engine.

According to a further aspect of the invention, the present invention relates to a hybrid vehicle comprising an electric drive system according to the invention.

According to a further aspect of the invention, the present invention relates to a method for the rotational speed regulation of an electric generator fed by an internal combustion engine, comprising the steps of measuring a rotational speed signal of the electric generator, determining an amplitude of rotational speed ripples of the measured rotational speed signal, determining a rotational speed correction signal on the basis of the determined amplitude of the rotational speed ripples and of the measured rotational speed signal, determining a phase difference signal between the measured rotational speed signal and the rotational speed correction signal, regulating the phase difference of the rotational speed correction signal on the basis of the determined phase difference signal to zero, and subtracting the rotational speed correction signal from the measured rotational speed signal in order to provide a corrected rotational speed for the rotational speed regulation of the electric generator.

A concept of the present invention is to compensate the torque surges generated in a pulsating manner in the internal combustion engine and the periodic torque ripple which occurs on the drive shaft of an electric generator by means of a corresponding correction signal for the rotational speed regulation of the generator. This takes place via a phase control loop (PLL, "phase-locked loop") which removes a subtraction of the ignition synchronous vibrations from the rotational speed control signal. As a result, the rotational speed controller of the generator control device no longer reacts to the torque ripple generated by the internal combustion engine and thus prevents torque vibrations at the drive shaft and simultaneously fluctuations in the current generation by the generator.

A significant advantage of this procedural approach is that vibrations which are fed back can be reduced to the housing of the internal combustion engine. Particularly in the case of internal combustion engines with low flyweights, this improves the NVH ("noise, vibration, harness") of the engine and consequently contributes to an extended service life of the engine components due to reduced mechanical wear on said components.

In addition, there is the advantage that current oscillations or current ripples can also be reduced in the current produced by the generator. Because the power loss in a battery increases quadratically with the amperage and proportionally to the battery internal resistance, the efficiency of the traction battery being supplied with current as well as the service life thereof can increase as a result of reduced heat input.

Finally, the use of a phase control loop vis-à-vis alternative methods, such as the use of notch filters for filtering the ignition frequencies, has the advantage that the control dynamics are not impaired, particularly because the phase control loop in contrast to notch filters does not have a shift in the phase response and therefore the phase reserve is not negatively impacted.

According to one embodiment of the phase control loop according to the invention, the phase control loop can furthermore have a harmonic generator, which is coupled to the input connection and which is designed to generate harmonic signals of the measured rotational speed signal and to output said harmonic signals as an input signal to the correction function device, wherein the correction function device is designed furthermore to determine the rotational speed correction signal on the basis of the harmonic signals. This particularly facilitates a correction of the torque on the drive shaft which is as accurate as possible, particularly in the case of asymmetrical torque pulsations. According to a further embodiment of the phase control loop according to the invention, the harmonic generator can be designed to generate harmonic signals up to at least the second harmonic. As a result, rotational speed ripples are simulated with adequate accuracy with a reasonable amount of computing time and effort.

According to one embodiment of the drive system according to the invention, the drive system can furthermore comprise a speed sensor which is designed to measure a rotational speed signal at the drive shaft of the electric generator and to output the result to the phase control loop.

Further features and advantages of embodiments of the invention ensue from the following description with references to the attached drawings.

DETAILED DESCRIPTION

Identical reference signs generally denote similar or similarly functioning components. The schematic geometric models shown in the figures are only of an exemplary nature and are illustrated in an ideal manner for the sake of clarity. It goes without saying that in practice geometric models which deviate from these models due to boundary conditions that deviate therefrom can result, and that the geometric models depicted are only used to illustrate principles and functional aspects of the present invention.

Figure 1:
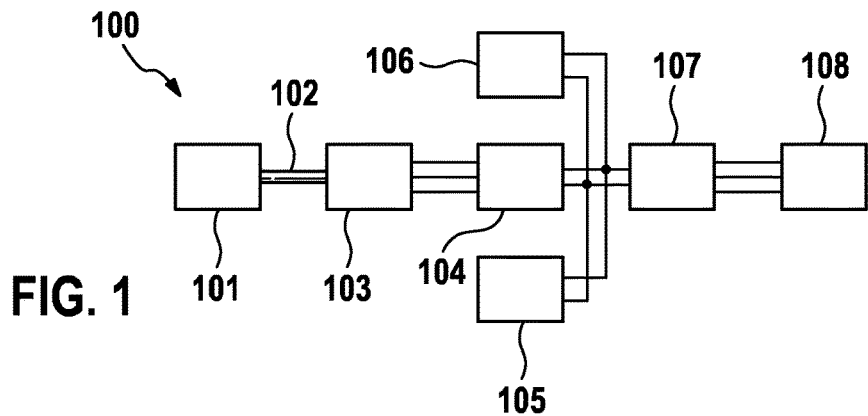
FIG. 1 shows a schematic depiction of an electric drive system of a hybrid vehicle according to one embodiment of the present invention.

FIG. 1 shows a schematic depiction of a drive train 100 for a serially coupled hybrid vehicle. The drive train 100 comprises an internal combustion engine 101, which, by way of example, is connected to an electric generator 103 via a drive shaft 102. Alternatively to a drive shaft 102, the internal combustion engine 101 and the generator 103 can also be connected to each other by means of a belt or a gearing mechanism. For example, the internal combustion engine 101 can be connected to the generator 103 via a belt and a corresponding gear transmission ratio such that the generator 103 rotates faster than the internal combustion engine 101. As a result, the optimal degrees of efficiency of both machines can be achieved, which can lie at different rotational speeds.

The electric generator 103 feeds a rectifier 104 which can feed a traction battery 105 on the one hand and a DC intermediate circuit 106 on the other hand. A power inverter 107 can be supplied with electrical DC voltage from the electric generator 103 or, respectively, the traction battery 105 and/or the DC intermediate circuit 106, wherein the power inverter 107 in turn provides a multiphase alternating current for the electric drive 108 of the drive train 100. Such drive train systems are primarily used in hybrid vehicles having a range extender.

In such drive train systems, the internal combustion engine 101 drives an electrical machine as a generator in order to either charge the traction battery 105 and/or to feed the electric drive 108. The internal combustion engine is always mechanically coupled to the generator 103 in the case of range extenders. Because the internal combustion engine 101 does not have to be operated at low rotational speeds, the flyweight of the internal combustion engine 101 can be selected small or completely saved, wherein only the mass of the internal combustion engine and of the electric machine is used as flyweight. This reduction of the flyweight, however, also causes simultaneously an increase in the torque ripple on the drive shaft due to the torque of the engine pulsating at the ignition frequency of the internal combustion engine 101.

Figure 2:
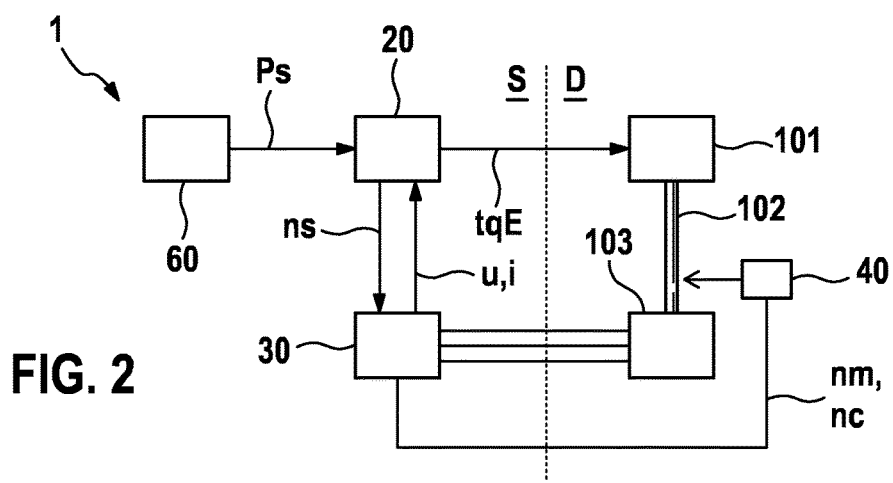
FIG. 2 shows a schematic depiction of an engine management system for an electric drive system according to a further embodiment of the present invention.

FIG. 2 shows a schematic illustration of an exemplary engine management system for an electric drive system 1, as said drive system can be used in a drive train 100 in FIG. 1. The engine management system has a control side S as well as a drive side D.

A vehicle control system 60 is located on the control side S, said vehicle control system displaying the driver's request and outputting the same as a target power signal Ps to an internal combustion engine control device 20. The internal combustion engine control device 20 is designed to determine a target value rotational speed signal ns from a target power output and output said signal to a generator control device 30. The internal combustion engine control device 20 simultaneously generates a target torque tqE for actuating the internal combustion engine 101. The generator control device 30 in turn reports electrical parameters, such as battery voltage u or generated electrical current i of the generator 103 back to the internal combustion engine control device 20 and simultaneously generates an n-phase AC signal for actuating the electric generator 103.

The drive system 1 can furthermore have a speed sensor 40 which is mounted on or in the proximity of the drive shaft 102 and detects an actual rotational speed of the drive shaft 102. This actual rotational speed is then converted by the speed sensor 40 into a measured rotational speed signal nm and outputted to the generator control device 30. It may also be possible in the speed sensor 40 to directly convert the rotational speed signal nm into a corrected rotational speed signal nc according to the phase regulation subsequently described with regard to FIG. 4 and to output the same to the generator control device 30.

Figure 3:
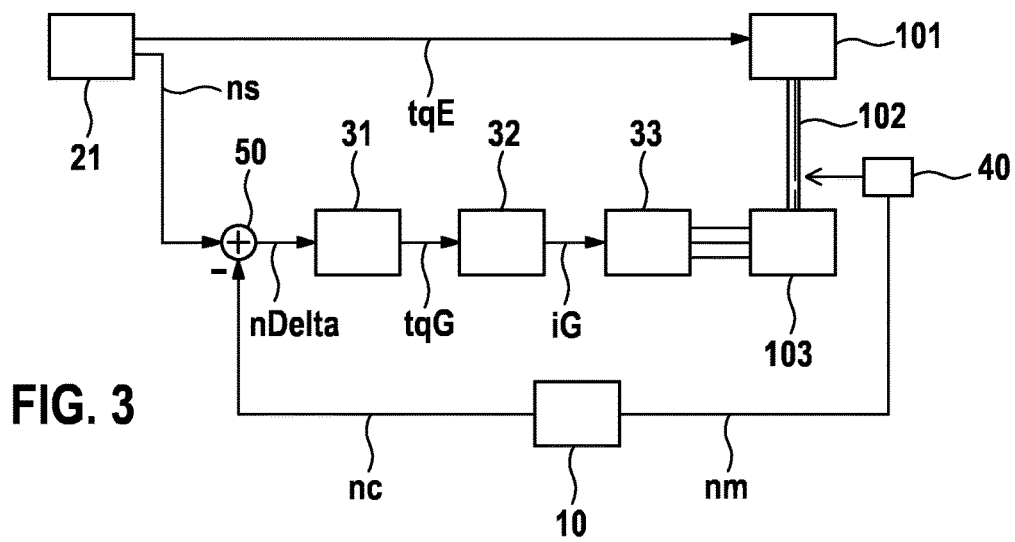
FIG. 3 shows a schematic depiction of the engine management system in FIG. 2 in greater detail according to a further embodiment of the present invention.

FIG. 3 illustrates a schematic depiction of the engine management system in FIG. 2 in greater detail. A power control device 21, which is, for example, part of the internal combustion engine control device 20 or can be implemented in the same, generates a target value rotational speed signal ns on the one hand and a torque target value tqE for actuating the internal combustion engine 101 on the other hand. The target value rotational speed signal ns is fed into a subtractor 50 which is designed to subtract a corrected rotational speed actual value signal nc generated by a phase control loop 10 from a target value rotational speed signal ns and to generate a rotational speed difference signal nDelta therefrom. The subtractor 50 as well as the phase control loop 10 can, for example, be part of the generator control device 30 or implemented in the same. The phase control loop 10 and the function thereof are explained in greater detail in connection with FIG. 4.

Figure 4:
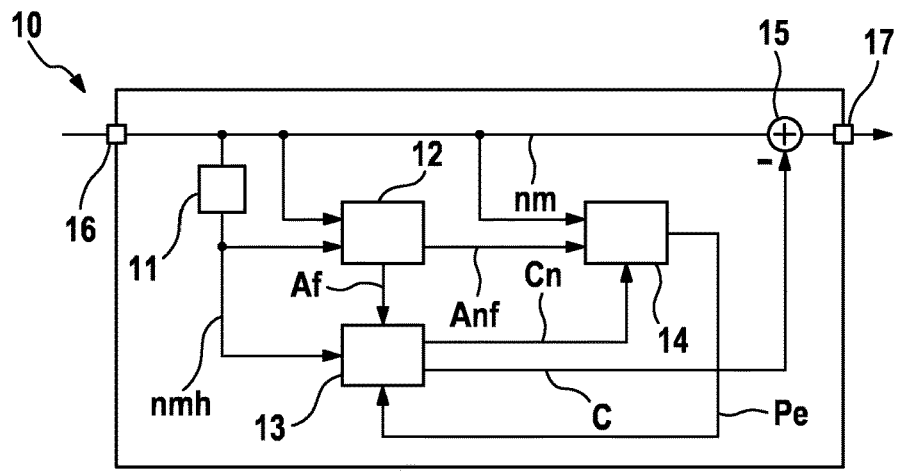
FIG. 4 shows a schematic depiction of a phase control loop for a generator control device according to a further embodiment of the present invention.

A rotational speed control device 31 is furthermore provided in the generator control device 30, said rotational speed control device being coupled to the subtractor 50. The rotational speed control device 31 is designed to determine a target value torque tqG from the rotational speed difference signal nDelta, said target value torque being fed into a current control device 32. This current control device 32 is designed to determine a target value current iG from the target value torque tqG that was determined. Said target value current iG is then converted into an n-phase AC signal for actuating the electric generator 103 in an n-phase power inverter device 33 which is coupled to the current control device 32. In the example of FIGS. 2 to 4, the electric generator 103 is a three-phase electric machine, wherein it may, however, also be possible to use an electric machine comprising another number of phases, depending on category and type of machine.

FIG. 4 shows a schematic depiction of a phase control loop 10 for a generator control device, for example of the generator control device 30 in FIG. 2. As already mentioned in connection with FIG. 2, the phase control loop 10 can also be implemented in the speed sensor 40. The phase control loop 10 can be implemented in hardware as well as in software. When implemented in software, the phase control loop 10 can be integrated into the software or firmware of the generator control device 30 and be supplied with input signals via the corresponding interfaces of the software of the generator control device 30. The phase control loop 10 can also be implemented as a separate component between the speed sensor 40 and the generator control device 30.

The phase control loop 10 is used to correct the rotational speed actual value signal nm of the electric generator 103 fed by the internal combustion engine 101. A rotational speed signal nm measured on the drive shaft 102 of the electric generator 103 is received at an input connection 16. A harmonic generator 11, which is coupled to the input connection 16, generates, from the measured rotational speed signal nm, harmonic signals nmh of the measured rotational speed signal nm up to a certain order, for example up to an including the second harmonic. In principal, there are any number of harmonics, wherein the number of the harmonics flowing into the regulation improve the accuracy of the reproduction of the rotational speed ripples. From a technical standpoint, the number is, however, limited by the resolution, i.e. the sample rate, of the rotational speed signal because the phase errors can only be adjusted with a precision of this resolution. The harmonic signals nmh are (together with the measured rotational speed signal nm) to be outputted as an input signal to a correction function device 13. The correction function device 13 is used furthermore to determine a rotational speed correction signal on the basis of the measured rotational speed signal nm as well as, if need be, on the basis of the harmonic signals.

The correction function device 13 can, for example, be designed as a numeric controlled oscillator (NCO) which, in addition to the rotational speed correction signal C, outputs a binary rotational speed correction signal Cn which only reflects the phase of the rotational speed correction signal C being normalized to 1.

In order to be able to determine the rotational speed correction signal C, an amplitude determination device 12 is provided which is fed with the measured rotational speed signal nm from the input connection 16, and can determine the amplitude Af of the rotational speed ripples of the measured rotational speed signal nm. This amplitude Af is provided to the correction function device 13, which determines the rotational speed correction signal C on the basis of the determined amplitude Af of the rotational speed ripples. The amplitude determination device 12 can have a high-pass filter which can filter the DC component out of the measured rotational speed signal. An option for the amplitude determination of the amplitude Af then consists of a Fourier decomposition of the rotational speed signal nm that has been adjusted for the DC component, particularly when considering the Fourier component of the first order. In so doing, the respective Fourier coefficients are determined and the amplitude Af is calculated proportionally to the quadratic mean of the Fourier coefficients.

The phase control loop 10 further comprises a phase discriminator 14, which is coupled to the amplitude determination device 12 and the correction function device 13. The phase discriminator 14 is used to determine a phase difference signal Pe between the measured rotational speed signal nm and the rotational speed correction signal C. To this end, the phase discriminator 14 normalizes the measured rotational speed signal to the defined amplitude Anf which is provided by the amplitude determination device 12 and compares the binary rotational speed correction signal Cn to the measured rotational speed signal nm. The phase difference signal Pe is then fed back into the correction function device 13 which can regulate the rotational speed correction signal C on the basis of the defined phase difference signal Pe to a phase difference of zero. As a result, the rotational speed correction signal C and the measured rotational speed signal nm can be brought into phase alignment; thus enabling the phase reserve of the rotational speed regulation comprising a corrected rotational speed signal nc, which as an output function of a summing element 15 subtracts the rotational speed correction signal C from the measured rotational speed signal nm, to be outputted at an output connection 17 of the phase control loop 10. The corrected rotational speed signal nc is used for the subtraction from the target rotational speed ns by means of the subtraction element 50 depicted in FIG. 3.

Figure 5:
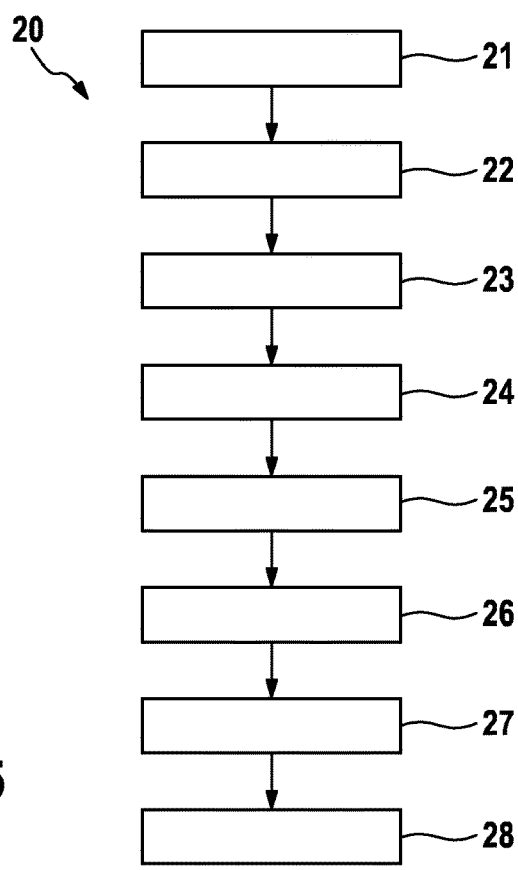
FIG. 5 shows a schematic depiction of a method for activating an electric drive system according to a further embodiment of the present invention.

FIG. 5 shows a schematic illustration of a method 20 for regulating rotational speed of an electric generator fed by an internal combustion engine. The method 20 can be used particularly with the aid of a phase control loop 10 as depicted in FIGS. 3 and 4 and explained for the rotational speed regulation in an engine management system as depicted in FIG. 2.

In a first step 21, a rotational speed signal nm is measured on the drive shaft 102 of the electric generator 103. A second step 22 comprises determining an amplitude Af of rotational speed ripples of the measured rotational speed signal nm. On the basis of the determined amplitude Af of the rotational speed ripples and the measured rotational signal nm, a rotational speed correction signal C can then be determined in step 23. A phase difference exists between the measured rotational speed signal nm and the rotational speed correction signal C, which phase difference is determined in step 24 and is fed back as the phase difference signal Pe so that, in step 25, a phase difference of the rotational speed correction signal C can be regulated to zero on the basis of the determined phase difference signal Pe. Finally in step 26, the rotational speed correction signal C can be subtracted from the measured rotational speed signal nm in order to provide a corrected rotational speed signal nc for the rotational speed regulation of the electric generator.

It is optionally possible in step 27 to generate harmonic signals nmh of the measured rotational speed signal nm and to additionally use said harmonic signals in step 28 to determine the rotational speed correction signal C.

The invention claimed is:

1. A phase control loop (10) for the rotational speed regulation of an electric generator (103) fed by an internal combustion engine (101), having:
   an input connection (16), configured to receive a rotational speed signal (nm) measured on a drive shaft (102) of the electric generator (103);
   an amplitude determination device (12) coupled to the input connection (16) and configured to determine an amplitude (Af) of rotational speed ripples of the measured rotational speed signal (nm);
   a correction function device (13) coupled to the amplitude determination device (12) and the input connection (16) and configured to determine a rotational speed correction signal (C) on the basis of the determined amplitude (Af) of the rotational speed ripples and of the measured rotational speed signal (nm);
   a phase discriminator (14) coupled to the amplitude determination device (12) and the correction function device (13) and configured to determine a phase difference signal (Pe) between the measured rotational speed signal (nm) and the rotational speed correction signal (C), wherein the correction function device (13) is configured to regulate the rotational speed correction signal (C) on the basis of the determined phase difference signal (Pe) to a phase difference of zero; and
   a summing element (15) configured to subtract the rotational speed correction signal (C) from the measured rotational speed signal (nm) and to provide a corrected rotational speed signal (nc) to an output connection (17) of the phase control loop (10);
   wherein an internal combustion engine control device (20) generates a target value rotational speed signal (ns), based on a power signal, for controlling a generator control device (30) and a target torque (tqE) for actuating the internal combustion engine (101) wherein the target value rotation speed signal (ns) is modified by the corrected rotational speed signal (nc).

2. The phase control loop (10) according to claim 1, furthermore comprising:
   a harmonic generator (11) coupled to the input connection (16) and configured to generate harmonic signals (nmh) of the measured rotational speed signal (nm) and to output said harmonic signals as an input signal to the correction function device (13), wherein the correction function device (13) is further configured to determine the rotational speed correction signal (C) on the basis of the harmonic signals (nmh).

3. The phase control loop (10) according to claim 2, wherein the harmonic generator (11) is configured to generate harmonic signals (nmh) up to at least the second harmonic.

4. A generator control device (30) for rotational speed regulation of the electric generator (103) fed by the internal combustion engine (101), comprising:
   a phase control loop (10) according to claim 1;
   a subtractor (50) configured to subtract a corrected rotational speed signal (nc) generated by the phase control loop (10) from a target value rotational speed signal (ns) and to generate a rotational speed difference signal (nDelta) therefrom;
   a rotational speed regulating device (31) which is coupled to the subtractor (50) and configured to determine a target value torque (tqG) from the rotational speed difference signal (nDelta);
   a current regulating device (32) coupled to the rotational speed regulating device (31) and configured to determine a target value current (iG) from the determined target value torque (tqG); and
   an n-phase power inverter device (33) coupled to the current regulating device (32) and configured to generate an n-phase AC signal for actuating the electric generator (103).

5. An electric drive system (1), comprising
   the internal combustion engine (101);
   the electric generator (103) connected to the internal combustion engine (101);
   the generator control device (30) according to claim 4 configured to actuate the electric generator (103); and
   an internal combustion engine control device (20) configured to output the target value rotational speed signal (ns) to the generator control device (30) and to output the target torque (tqE) for actuating the internal combustion engine (101).

6. The electric drive system (1) according to claim 5, further comprising:
   a speed sensor (40) configured to measure a rotational speed signal (nm) on the drive shaft (102) of the electric generator (103) and to output said rotational speed signal to the phase control loop (10).

7. A method (20) for the rotational speed regulation of an electric generator (103) fed by an internal combustion engine (101), the method comprising:
   measuring (21) a rotational speed signal (nm) of the electric generator (103);
   determining (22) an amplitude (Af) of rotational speed ripples of the measured rotational speed signal (nm);
   determining (23) a rotational speed correction signal (C) based on the determined amplitude (Af) of the rotational speed ripples of the measured rotational speed signal (nm);
   determining (24) a phase difference signal (Pe) between the measured rotational speed signal (nm) and rotational speed correction signal (C);

regulating (25) the phase difference of the rotational speed correction signal (C) based on the determined phase difference signal (Pe) to zero; and subtracting (26) the rotational speed correction signal (C) from the measured rotational speed signal (nm) in order to provide a corrected rotational speed signal (nc) for the rotational speed regulation of the electric generator (103);

generating a target value rotational speed signal (ns), based on a power signal, for controlling a generator control device (30) and a target torque (tqE) for actuating the internal combustion engine (101) wherein the target value rotation speed signal (ns) is modified by the corrected rotational speed signal (nc).

8. The method (20) according to claim 7, further comprising:

generating (27) harmonic signals (nmh) of the measured rotational speed signal (nm); and determining (28) the rotational speed correction signal (C) based on the harmonic signals (nmh).

9. A hybrid vehicle, comprising an electric drive system (1) according to claim 5.

\* \* \* \* \*